United States Patent [19]

Palmquist

[11] Patent Number: 4,752,938
[45] Date of Patent: Jun. 21, 1988

[54] BAFFLED GLASS MELTING FURNACES

[75] Inventor: Ronald W. Palmquist, Horseheads, N.Y.

[73] Assignee: Corning Glass Works, Corning, N.Y.

[21] Appl. No.: 599,552

[22] Filed: Apr. 12, 1984

[51] Int. Cl.⁴ .............................................. C03B 5/027
[52] U.S. Cl. ....................................................... 373/31
[58] Field of Search ........................... 373/27, 29–35; 65/135, 347

[56] References Cited

U.S. PATENT DOCUMENTS

| | | |
|---|---|---|
| 2,360,373 | 10/1944 | Tiede . |
| 2,377,772 | 6/1945 | Fletcher et al. . |
| 2,512,761 | 6/1950 | Arbeit ................................ 373/31 X |
| 2,641,454 | 6/1973 | Labino . |
| 3,208,841 | 9/1965 | Burch ................................ 373/31 X |
| 3,283,055 | 11/1966 | Trethewey . |
| 3,378,618 | 4/1968 | Vach et al. ............................ 373/31 |
| 4,366,571 | 12/1982 | Palmquist . |

FOREIGN PATENT DOCUMENTS 785235 12/1980 U.S.S.R. ................................ 373/30

Primary Examiner—Roy N. Envall, Jr.
Attorney, Agent, or Firm—Alfred L. Michaelsen

[57] ABSTRACT

There is disclosed a glass melting furnace having various forms of baffles located within the melt for dividing the furnace into zones and creating extended flow paths within the furnace for increasing the minimum residence time of the glass within the furnace and thereby improving glass melting and refining.

20 Claims, 5 Drawing Sheets

BAFFLED GLASS MELTING FURNACES

BACKGROUND OF THE INVENTION

The present invention relates to improvements in glass melting furnaces. In particular, the improved glass melting furnace has one or more internal baffles. The baffles confine and direct glass flow within the furnace so that temperature control and fining is improved.

In a glass melting furnace, the time an element of glass remains in the furnace is called the residence time. Residence time has a significant influence on glass quality. As a practical matter, not every element of glass in the furnace has the same residence time. Therefore, the shortest time it takes an element of glass to travel from the inlet of the furnace to the outlet is called the minimum residence time (sometimes hereinafter referred to as the MRT).

In effect, the glass quality is a direct function of the MRT. If the MRT is too short, the glass will not be fully melted or refined. If the MRT is too long, the efficiency of the furnace will be reduced. The factors affecting the MRT must therefore be characterized and quantified before the MRT may be controlled accurately.

One factor of interest is the shortest path from the inlet to the outlet. In a glass melting furnace, the shortest path is not necessarily a straight line from the inlet to the outlet, because molten glass does not usually move uniformly in a straight line.

It is well known that the density of glass is a function of its temperature. The temperature differences in the glass resulting from localized heat input in the furnace cause the hotter, lighter glasses to rise and the heavier, cooler glasses to descend. This movement of glass is commonly called convection.

The shortest flow path from the inlet to the outlet of a furnace is a function of the pattern of rising and descending glass in the furnace. The location and magnitude of heat input, the glass composition and the furnace geometry influence the convection pattern and the MRT. Heat input and location affect the magnitude and direction of glass flow. Glass composition affects convection because infrared transmission is highly dependent thereon, and convection is strongly dependent on the transmission of infrared radiation through the glass. Such transmission is difficult to control because small changes in the glass composition may have a significant affect on infrared transmission. However, the furnace geometry is the most predominant factor affecting convection because it is the most difficult to change once the furnace is built.

If the volume of glass in the furnace is relatively large and unobstructed, the glass is free to move anywhere in the furnace under the influence of the heat input. Unrestricted movement of glass caused by heating is called free convection. If the glass is confined to a relatively small volume, for example a pipe or a duct, the movement of glass is directed or channeled. This is called forced convection.

If the furnace is designed so that the glass is channeled, and thereby undergoes forced convection, the MRT may be more accurately controlled.

If the furnace is designed to melt only one type of glass, the design may be rigidly adapted to produce an optimum MRT for that particular glass. If the furnace is built to melt a variety of glasses, the design must be flexible enough to allow operation of the furnace under various conditions so that each glass composition experiences the correct MRT.

It has been found that certain glasses have improved quality when subjected to relatively high temperatures for a sustained period of time, and also when such glasses are provided with a lengthened flow path, such as by flowing the glasses in paths of limited depths along horizontal surfaces transversely of the shortest path extending axially of the furnace between the inlet and outlet ends thereof. The relatively high temperature helps to put glass batch materials into solution and significantly reduces the problems of unmelted batch stones in the glass. The transverse horizontal paths of limited depth not only allow air bubbles or seeds to agglomerate and move up and out of the glass, but also increase the length of the flow path through the furnace and thereby increase the MRT.

The present invention uses both these techniques, through the use of baffles hereinafter described, to improve glass quality. The baffles, made of a material which is highly resistant to deformation and creep such as molybdenum, also divide the furnace into separate zones, each of which may undergo independent temperature control. This produces a flexible furnace capable of handling a wide variety of glass compositions. Other advantages of the invention will be pointed out in the following description.

SUMMARY OF THE INVENTION

In the preferred embodiment, the present invention comprises a vertical glass melting furnace having upstanding sidewalls and a bottom wall forming a vessel for containing a bath of molten glass therein. Means is provided for introducing heat energy into the furnace for melting the glass. The molten glass moves along a flow path, from an inlet to an outlet of the furnace, at a characteristic flow rate for such glass at a given temperature. The molten glass tends to form at least one pattern of convection, driven by temperature differences in the glass, resulting at least in part from heat energy introduced by said melting means. Baffle means, located within the molten glass, forms a barrier across the furnace transversely of the flow path thereof. Said barrier is provided with a passageway for the glass. The baffle means divides the furnace into at least two zones, creating forced convection from one zone into the other.

The baffle increases the length of the flow path from the inlet, through the passageway and to the outlet; reduces free convection by limiting the depth or volume of the individual flow paths; and increases minimum residence time of glass within the furnace.

Other variations and modifications of the invention will become apparent in the following description.

DESCRIPTION OF THE PREFERRED EMBODIMENT

Figure 1:
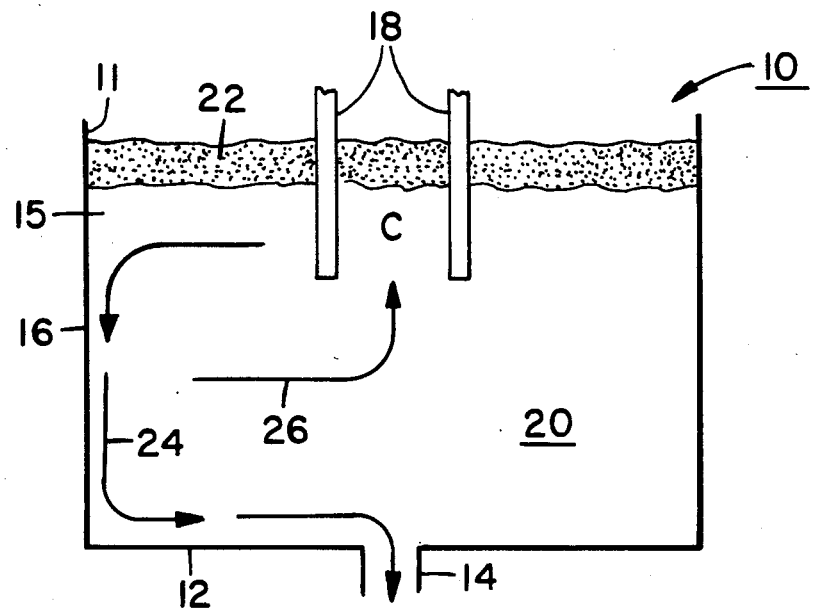
FIG. 1 is a schematic side sectional view of an electric glass melting furnace.

FIG. 1 shows a vertical glass melting furnace 10 of the type shown in U.S. Pat. No. 4,366,571, issued Dec. 28, 1982. The furnace 10 has an inlet end 11, a bottom wall 12 and upstanding sidewalls 16. Bottom wall 12 has an outlet 14 therein. The furnace 10 contains a bath of molten glass 20. Glass forming batch materials, forming batch blanket 22, are deposited at the inlet end on top of molten glass 20 in a known manner. Electrodes 18, passing through the batch blanket 22 near center C of the furnace 10, are coupled to a source of electrical energy (not shown). The electrodes 18 dissipate electrical energy in the molten glass 20 in a known manner. The electrical energy is concentrated near the upper portion of the bath 20.

In the furnace 10 of FIG. 1, the sidewalls 16 are somewhat removed from the concentrated heat energy provided by the electrodes 18, and tend to be cooler than the center C. The glass 20 near the sidewalls 16 tends to be cooler and heavier than glass near the center C. Thus, a primary free convection current 24 is set up in the furnace 10 which moves from the center C, horizontally under the batch blanket 22, down along the sidewalls 16 and along bottom wall 12 to the outlet 14. A portion of the primary convection current 24 is re-circulated as a secondary current 26 for re-circulation towards the electrodes 18 and the center C of the furnace.

The minimum residence time (MRT) in the furnace 10 can be calculated as the time it takes an element of glass to move from a point 15 at an upper inlet portion of the furnace 10, near the sidewall 16 immediately below the batch blanket 22, to the outlet 14. Some glass will be re-circulated along the recirculation path 26. However, a certain portion of the glass 20 never experiences the high heat concentrated near the electrodes 18. This may cause glass quality problems because, unless the glass 20 experiences high heat or a reasonably long residence time, seeds and stones may not be dissolved or dissipated.

Figure 2:
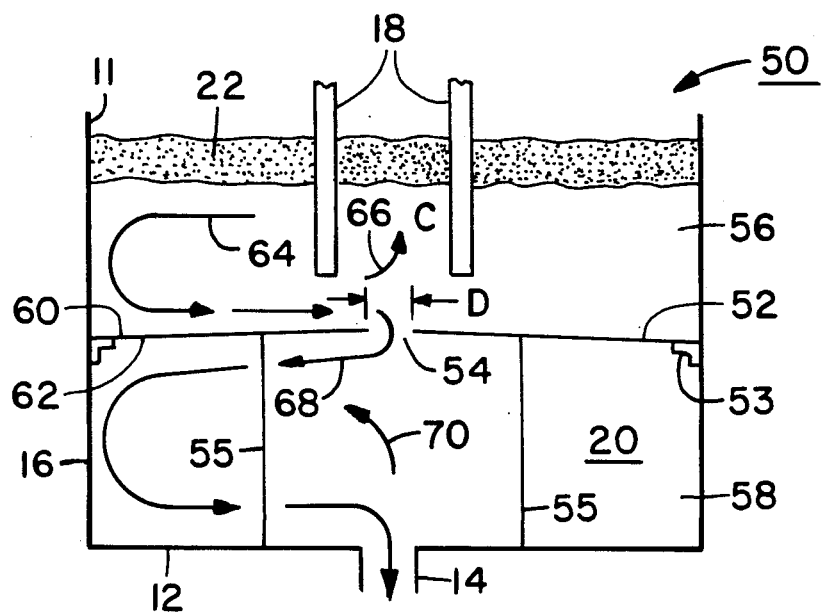
FIG. 2 is a schematic side sectional view of a furnace of the present invention illustrating a single aperture baffle.

FIGS. 2 through 6 illustrate various embodiments of a furnace incorporating baffles for suppressing free convection and increasing the MRT. In FIG. 2, furnace 50 has an inlet end 11, a bottom wall 12 forming an outlet end, and a sidewall 16. Bottom wall 12 has an outlet opening 14 therein. The furnace 50 contains a bath of molten glass 20, and a batch blanket 22 floating on top of the glass 20 adjacent inlet end 11. Electrodes 18 pierce the batch blanket 22 near the center C of the furnace 50 for supplying electrical energy to the glass 20. A baffle 52, located within the furnace 50, may be supported by brackets or wall abutment means 53 and legs 55, and extends transversely across the shortest path between the inlet and outlet ends of the furnace, which path extends substantially axially of outlet 14. The baffle 52 segments the furnace 50 into respective upper and lower zones 56 and 58 and essentially separates the volume of molten glass in each zone from the other. The baffle 52 has a relatively small flow passageway therein in the form of an aperture or opening 54, which allows for communication between the upper and lower zones 56 and 58. Preferably, the aperture 54 has a limited maximum diameter D in order to avoid free convection currents between the molten glass in the adjacent zones, but one which is sufficient to minimize the pressure difference across the baffle 52.

A convection current 64 is generated in the upper zone 56, by heat dissipated by the electrodes 18. The upper free convection current 64 extends from a melt zone along the bottom of the batch blanket 22, down the sidewalls 16 and along an upper surface 60 of the baffle 52. Some of the glass 20 recirculates in an upper recirculation convection current 66, as shown, and some of the glass 20 flows through the aperture 54 into the lower zone 58. A lower convection current 68 follows a lower surface 62 of the baffle 52 outwardly towards the sidewalls 16, down the same and along the bottom wall 12 to the outlet 14. A lower recirculation convection current 70 carries some of the glass 20 back into the lower convection current 68 as shown. The lower convection current 68 results from the heat in the upper portion of the furnace 50 being radiated across the baffle 52, and the difference in temperature between the center of the furnace and the sidewalls. However, current 68 moves more slowly than the current 24 shown in FIG. 1, because the glass flowing in current 64 along surface 60 (transversely of the shortest axial path) is heated by electrodes 18 as it flows toward aperture 54, and hence the temperature difference of the glass between the center C and sidewalls 16 is less than that exhibited in furnace 10. The transverse flow along surfaces 60 and 62 increases the length of the flow path through furnace 50, which together with the slower flow of current 68, increases the MRT of the glass within the furnace.

Figure 3:
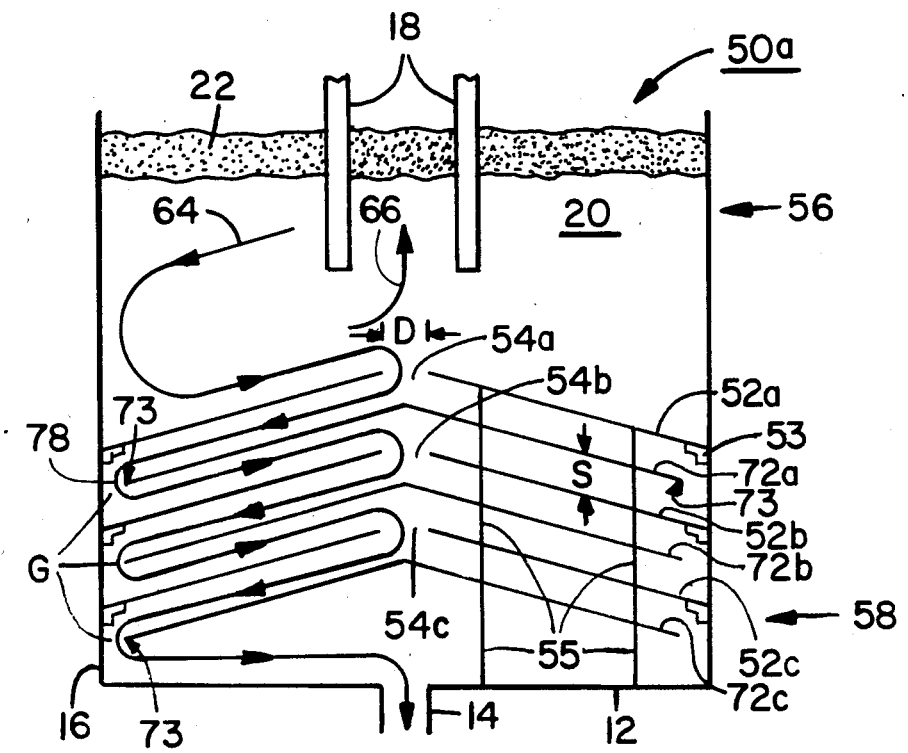
FIG. 3 is a schematic side sectional view of another embodiment of the furnace of the present invention having a plurality of baffles creating an elongated force convection pattern.

Furnace 50a, shown in FIG. 3, illustrates a variation of the furnace 50 described above. A plurality of baffles 52a, 52b and 52c, hereinafter sometimes referred to either collectively or individually as apertured baffles, are located in the furnace 50a. Each baffle 52a, 52b and 52c has a respective aperture or opening 54a, 54b and 54c as shown. Below each of the apertured baffles 52a, 52b and 52c is a respective baffle 72a, 72b and 72c, sometimes hereinafter referred to collectively as intermediate baffles. The apertured baffles 52 and intermediate baffles 72 may be supported by brackets 53 and legs 55, the latter bearing against the respective baffle therebelow or the furnace bottom 12 as shown on the right side of FIG. 3. The intermediate baffles 72a, 72b and 72c are preferably in the form of plates or conical discs having a cross-section similar to that of the furnace. The baffles 72 provide a gap or passageway G for the glass 20 between a marginal edge 73 thereof and the sidewalls 16 of the furnace 50a. The apertured baffles 52a, 52b and 52c are separated from the intermediate baffles 72a, 72b and 72c by a spacing S, determined by the height of the various legs 55. The legs 55, which may be in the form of perforated cylindrical members, have been omitted on the left side of FIG. 3 for purposes of clarity in showing the flow path through lower section 58. In the embodiment of FIG. 3, spacing S is shown to be uniform. The baffles described above are preferably conical in shape and highly resistant to deformation or creep.

The furnace 50a may be considered to be divided into two main sections, namely, the upper section 56 and the lower 58. The upper section 56 has an upper free convection current 64 and a recirculation convection current 66. The lower section 58 has a forced convection current 78 which follows the flow path as shown. The convection current or flow path 78 extends from the aperture 54a in the baffle 52a towards the sidewalls 16, around the marginal edge 73 of the intermediate baffle 72a, then towards the aperture 54b in the baffle 52b, and so on through a serpentine or tortuous path to the outlet 14 of the furnace 50a. In this way, the glass 20 flows along an extended path of limited depth from the bottom of the upper portion 56 of the furnace 50a to the outlet 14. The minimum residence time is increased by virtue of the long flow path, extending transversely of the shortest path between the melting zone and outlet, that the glass 20 must follow to reach the outlet 14. Depending upon the spacing S between the surfaces of apertured baffles 52a, 52b and 52c and the respective intermediate baffles 72a, 72b and 72c, which governs the volume or vertical depth of the glass within each flow space bounded thereby, there is little or no free convection in the lower portion 58 of the furnace 50. The spacing S, the gap G and the diameter D of the openings 54a, 54b and 54c are each a function of the particular furnace design.

Figure 4:
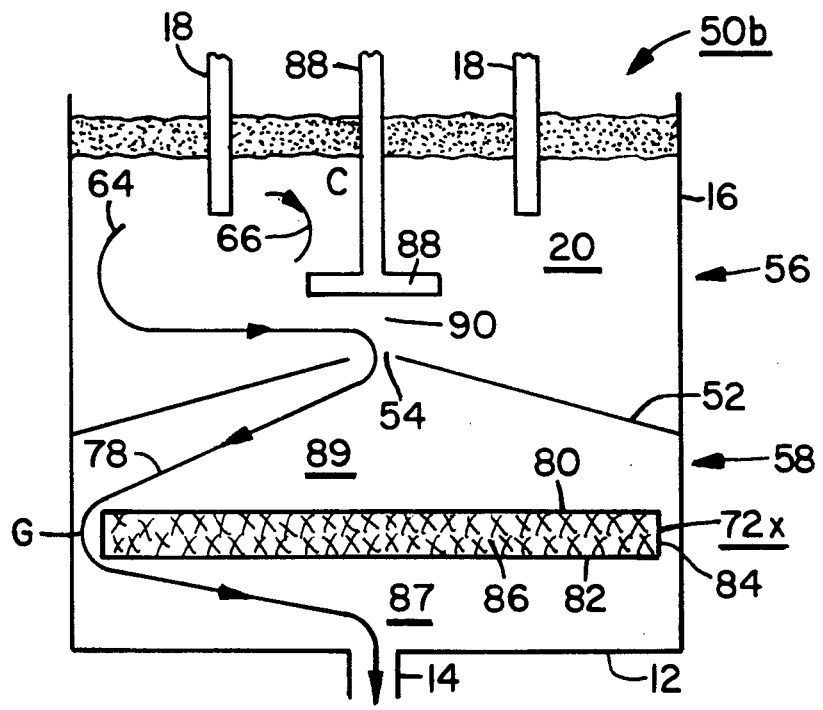
FIG. 4 is a schematic side sectional view of a furnace of the present invention utilizing a single aperture baffle and an insulated baffle.

In FIG. 4, furnace 50b includes an apertured baffle 52 and an intermediate baffle 72x. The flow patterns are similar to those illustrated in FIGS. 2 and 3, including upper convection current 64 with upper recirculation convection current 66, and an extended convection current or flow path 78. The usual support legs have been omitted for purposes of clarity.

The intermediate baffle 72x is insulated, as shown, and includes upper and lower plates 80 and 82 bounded by a marginal plate 84. The interior of the baffle 72x contains a body of insulation 86.

The insulated intermediate baffle 72x reduces heat flow from the upper portion 56 of the furnace 50b and the area 89 directly above the baffle 72x, into the lower portion 87 directly below it. Because the baffle 72x effectively blocks the radiation and conduction of heat from the area 88 to the lower portion 87, the heat which is lost from the bottom wall 12 of the furnace 50b, must originate from the glass in flow path 78 rather than directly from the electrodes. Hence, since a supply of energy is removed from the glass in lower portion 87, the temperature of the glass flowing through outlet 14 is greatly reduced. Because less energy is removed from the furnace in the discharged glass, less power must be supplied to the upper portion 56 of the furnace 50b, thereby increasing the efficiency of the furnace 50b. Further, because the temperature of the glass 20 leaving the furnace 50b is reduced, the cost of glass cooling equipment downstream is reduced. It should be understood that the apertured baffle 52 may be an insulated structure similar to that of the insulated baffle 72x referred to above. Further, either may be used alone or in combination with other baffles herein described.

There may also be provided a hot spot electrode 88, shown piercing the batch blanket 22 in the center C of the furnace 50b. The hot spot electrode 88 may fire to the apertured baffle 52 and thereby create a very hot zone 90 in the vicinity of the aperture 54. Thus, the glass 20 melted in the upper portion 56 of the furnace 50 experiences a high concentration of heat energy in the hot zone 90. The hot spot electrode 88 may be used with any baffle herein described. The hot spot electrode 88 is especially useful with the insulated intermediate baffle 72x because the insulation provided by the baffle 72x enhances the efficiency of the hot zone 90 produced by said hot spot electrode 88 by inhibiting radiation loss through the bottom wall.

Figure 5:
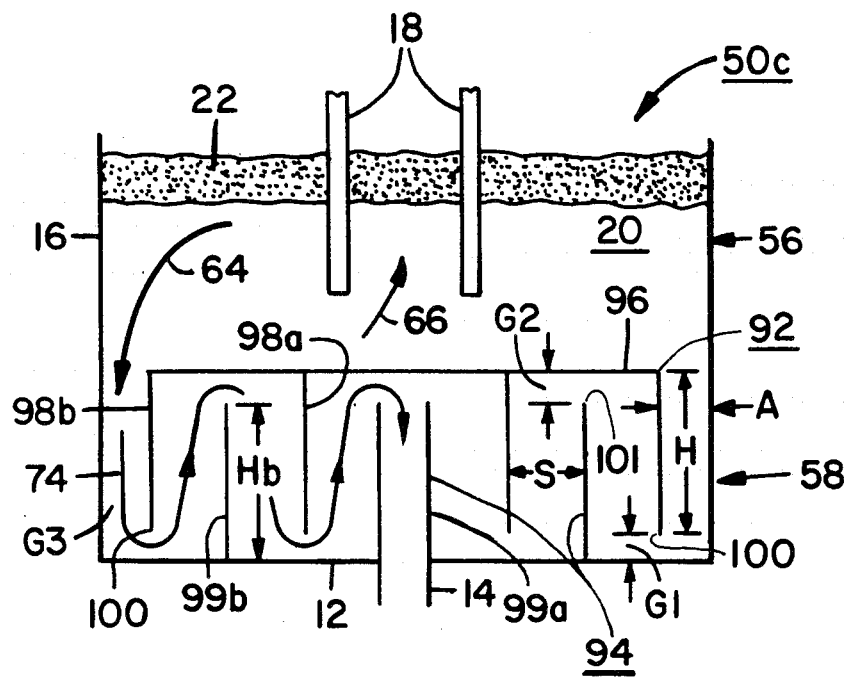
FIG. 5 is a schematic side sectional view of another embodiment of the furnace of the present invention utilizing cylindrical baffles.

FIG. 5 illustrates another embodiment of the present invention wherein opposed respective upper and lower cylindrical baffles 92 and 94 are located in the lower portion 58 of furnace 50c. In the upper portion 56, the upper free convection current 64 and upper recirculation convection current 66 exist as hereinbefore described. In the lower portion 58 of the furnace 50c, forced convection current 74 follows a path between the cylindrical baffles 92 and 94. Upper baffle 92 comprises a circular disc or plate 96 and depending respective inner and outer concentric cylinders 98a and 98b. The lower baffle 94 comprises a pair of respective inner and outer upstanding cylinders 99a and 99b. The upper baffle 92 may be supported by means (not shown) so that a lower margin 100 of said upper baffle 92 is separated from the bottom wall 12 of the furnace by a gap $G_1$. Alternately, the upper baffle 92 may rest on the furnace bottom 12 with the lower margin 100 in contact therewith, and a plurality of holes (not shown) may be provided near said lower margin 100 for allowing the glass 20 to flow in the direction of the arrows.

An upper margin 101 of the lower baffle 94 may be separated from the plate 96 by a spacing $G_2$. Alternately, the plate 96 may rest atop the upper margin 101, and holes (not shown) may be provided near the margin 101 to allow the glass 20 to flow in the direction of the arrows. Gaps $G_1$ and $G_2$ may be equal to each other. The depending cylindrical members 98a and 98b and the upstanding cylindrical members 99a and 99b are separated from each other by radial spacing S as shown. The outer depending cylindrical member 98b is separated from the sidewall 16 by a gap $G_3$. Each of the respective depending cylindrical members and upstanding cylindrical members 98a–98b and 99a–99b have a height H, Hb, as shown. All the dimensions hereinbefore described may be varied in accordance with design parameters.

A forced convection current 74 extends from the gap $G_3$ between the depending cylindrical member 98b and the sidewalls 16, under the lower margin 100 of said depending cylindrical member 98b and between the same and the next inwardly concentric upstanding outer cylindrical member 99b and so on through a tortuous path towards the outlet 14. The glass 20 follows the tortuous forced convection current 74 to the outlet 14, and thereby experiences sufficient residence time to produce good quality glass.

Figures 6A, 6B, 6C:
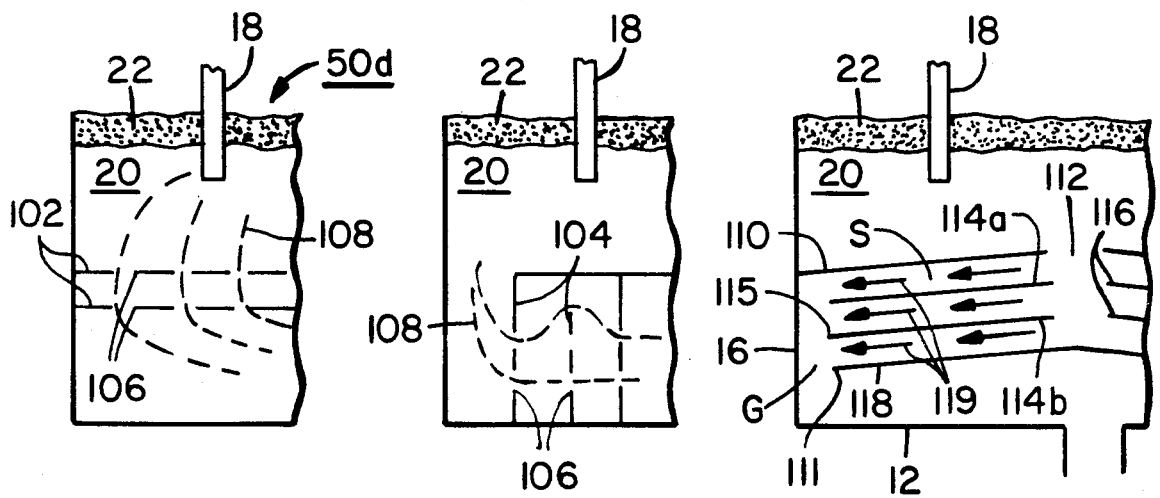
FIGS. 6a-6c illustrate variations of the above mentioned embodiments in fragmented schematic side sectional views.

FIGS. 6a–6c show a variety of alternative embodiments of the present invention. In FIG. 6a, for example, furnace 50d is provided with a pair of baffles 102 having apertures 106. The glass flows through the apertures 106 via the flow paths 108. Although each flow path 108 is not significantly lengthened by the baffles 102, some mixing and refining occurs as a result of the glass 20 passing through the apertures 106. However, free convection currents are retarded or eliminated by the baffles, and transverse flow is obtained, so that the MRT is increased. Further, the apertures 106 may be sized depending upon the projected flow pattern of the glass 20 within the furnace 50d. For example, where the glass 20 is most fluid the aperture 106 may be sized downwardly. Where the glass 20 is more viscous, the apertures 106 may be larger so that the flow through the furnace 50d may be balanced.

In FIG. 6b, circumferentially opposed concentric cylindrical baffles 104 are shown having apertures 106 therein. This arrangement is similar to the arrangement of FIG. 5. The glass moves along flow paths 108 through the apertures 106 as shown.

FIG. 6c shows a variation of the arrangement illustrated in FIG. 3. A baffle 110 has an aperture 112 therein. An intermediate baffle 118 is located below the baffle 110 and has its marginal edge 111 spaced from the sidewall 16 by gap G. Fining plates or baffles 114a and 114b are located between the baffle 110 and the intermediate baffle 118. Each of the fining plates 114a and 114b has an aperture 116 therein. Marginal edges 115 of the fining plates are spaced from sidewalls 16 by gap G. The glass 20 flows in parallel forced convection currents 119 between the fining plates 114a and 114b, the baffle 110 and the intermediate baffle 118. Spacing S between the baffles and plates 110, 114a, 114b and 118 is relatively narrow thereby forming limited depth flow paths therebetween, which reduce free convection velocities. Each spacing is bounded by horizontal, or nearly horizontal, surfaces against which the glass 20 may flow, transversely of the shortest flow path, for providing improved fining.

Figure 7A:
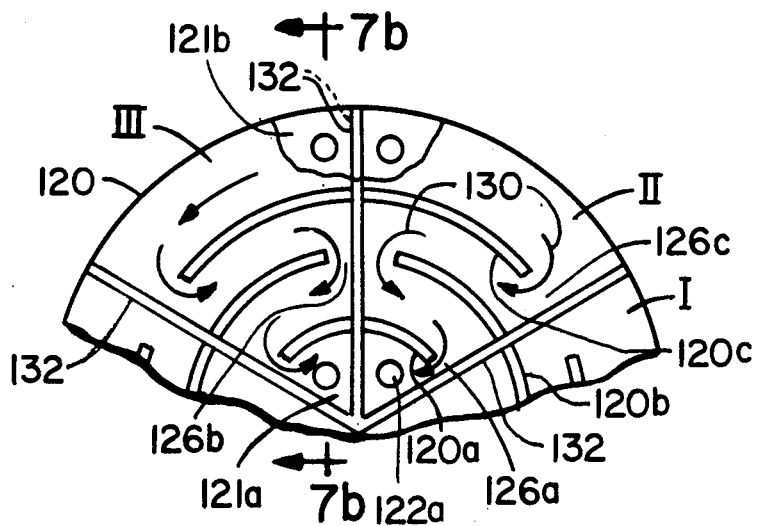
FIGS. 7a-7d illustrate circumferential baffles forming additional embodiments of the invention.
Figure 7B:
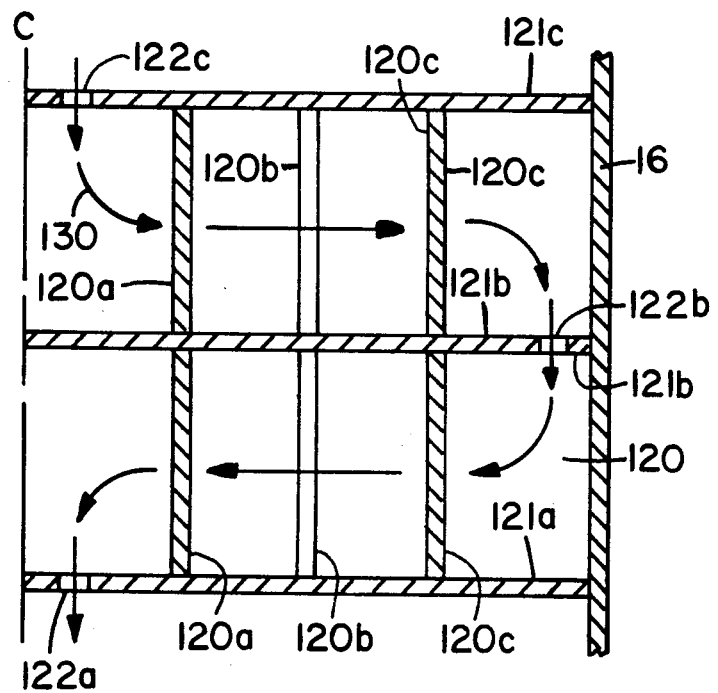

In another embodiment of the invention, shown in FIGS. 7a and 7b, cylindrical baffles 120 are detailed. Each baffle 120 comprises one or more sets of segmented cylindrical members 120a, 120b and 120c, etc., preferably sandwiched between shared pairs of plates 121a, 121b and 121c. The plate 121a has an opening 122a therein inboard or centrally C of the baffle 120, and the plate 121b has a hole or holes 122b located outboard thereof. Similarly, plate 121c has an inboard hole 122c. Alternate cylindrical members (e.g., 120a and 120c) have respective spaces, holes or passageways 126a 126c in radial alignment. The cylindrical member 120b therebetween has its holes, spaces or passageways 126b circumferentially offset so that the glass 20 flows back and forth as shown along the path shown by arrows 130 or vis versa. Radial partition walls 132 may be used if desired to divide the baffle 120 into separate circumferential zones I, II, III, etc.

In FIG. 7b, taken along line 7b-7b of FIG. 7a, flow through the baffles 120 in the vertical direction is shown. The flow proceeds via flow path 130 through the holes 122c, 122b and 122a.

Figure 7C:
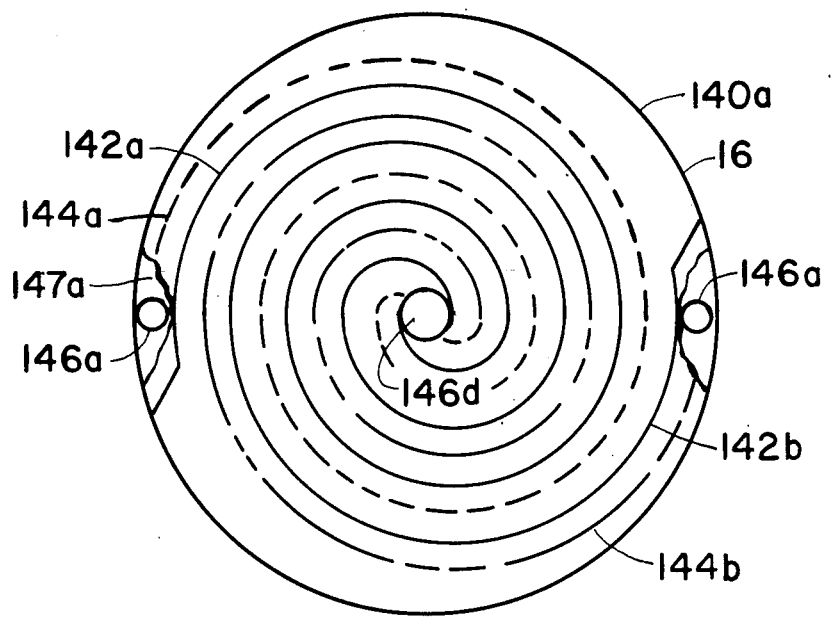
Figure 7D:
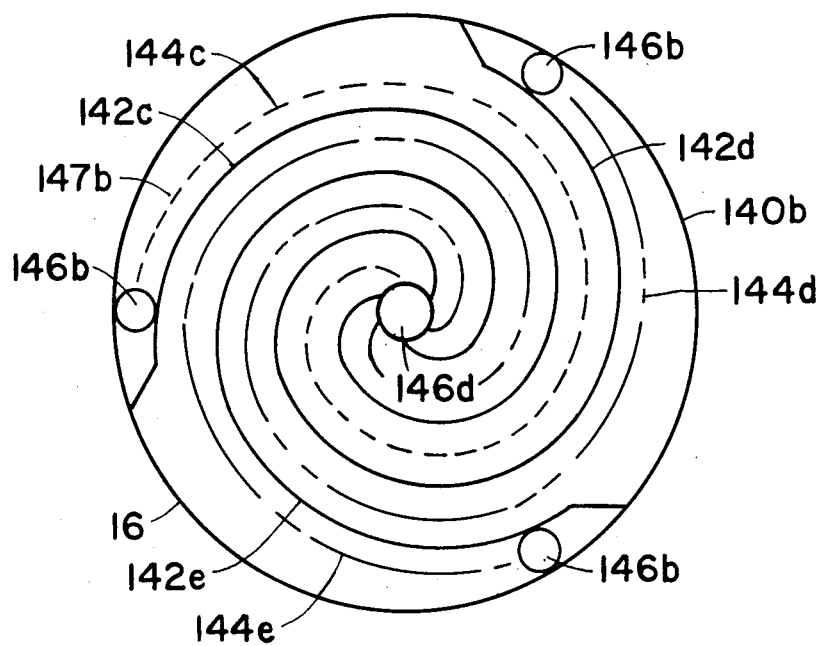

Other embodiments of circumferential baffles are shown respectively in FIGS. 7c and 7d as spiral baffles 140a and 140b, positioned within the sidewalls 16 of a furnace. The baffle 140a includes a double spiral baffle member as shown in 7c having spiral walls 142a and 142b, thereby creating double flow paths 144a and 144b. Multiple respective entrances 146a and an exit 146d may be provided as shown. Also, the spiral baffles may be stacked between plates 147a, having openings 146a and 146b, similar to the arrangement of FIGS. 7a and 7b. When multiple spiral walls are used, the inlet holes are symetrically arranged. For example, for a two-walled spiral, the holes 146a are 180° apart.

Referring now to FIG. 7d, the baffle 140b includes a triple spiral member having spiral walls 142c, 142d and 142e, thereby creating flow paths 144c, 144d and 144e. Multiple respective entrances 146b are provided for each flow path within a plate 147b, which paths terminate in an exit opening 146d. Again, the inlet holes 146b are symetrically arranged circumferentially about the baffle 140b, and as such are 120° apart.

It should be understood that one or more of the different baffles herein described may be used in combination for achieving the desired design result, and such is within the spirit and scope of the invention.

What is claimed is:

1. In a glass melting furnace having means for melting glass batch adjacent an inlet end and means adjacent an outlet end for delivering molten glass from said furnace;
    baffle means, positioned within said furnace transversely across the shortest path extending between said inlet and outlet ends, for providing a plurality of interconnected zones within said furnace including a first zone adjacent said inlet end and a second zone adjacent said outlet end,
    said baffle means including at least one open portion for facilitating the flow of molten glass between adjacent zones,
    said baffle means including a plurality of surface means for providing extended flow paths which are directed transversely of said shortest path for increasing the minimum residence time of the molten glass within the furnace,
    and at least some of said surface means being positioned relatively close to one another for reducing free convection currents within the glass flowing in said extended flow paths.

2. A glass melting furnace as defined in claim 1 wherein said zones provided by said baffle means each contains a limited volume of molten glass relative to the total volume of the furnace, and said baffle means essentially separating the volume of molten glass in each zone from that of an adjacent zone, except for said open portion forming a limited passageway therebetween, so that free convection currents are materially reduced within the molten glass retained by the furnace.

3. A glass melting furnace as defined in claim 1 wherein at least one of said zones contains a plurality of spaced-apart baffle members providing flow passageways therebetween, each of said spaced-apart baffle members having at least one open portion communicating with the flow passageways formed on opposite sides thereof, and said communicating flow passageways directing the flow of molten glass between the inlet and outlet ends of the furnace along an extended flow path having a direction which is generally transverse to said shortest path.

4. A glass melting furnace as defined in claim 3 wherein adjacent baffle members have offset open portions communicating with the flow passageways formed on opposite sides thereof so as to form a serpentine flow path.

5. A glass melting furnace as defined in claim 3 including means spacing said plurality of baffle members relative to one another for limiting the volume of molten glass within the flow passages between adjacent members and for minimizing free convection currents within the molten glass.

6. A glass melting furnace as defined in claim 3 wherein said plurality of spaced-apart baffle members includes a series of vertically spaced-apart conical baffle members positioned within and extending across a vertical melting furnace providing flow passageways therebetween, alternate ones of said conical baffle members having a central open portion communicating between adjacent passageways, intermediate conical baffle members between said alternate members having a peripheral open portion communicating with adjacent flow passageways, said interconnected flow passageways forming an extended tortuous flow passageway for the molten glass within the furnace thus increasing the minimum residence time thereof, and the adjacent baffle members being spaced sufficiently close together to limit the depth of the glass in the flow passageways therebetween to an extent to virtually eliminate free convection currents in the molten glass within such flow passageways.

7. A glass melting furnace as defined in claim 3 wherein said spaced-apart baffle members includes a plurality of concentric, axially aligned and radially spaced-apart cylindrical-like members positioned substantially concentrically with said shortest path, means for closiing off axial end portions of said cylindrical-like members, each of said cylindrical-like members having an open portion communicating with flow passageways formed on opposite sides thereof, and said communicating flow passageways formed between said spaced-apart cylindrical-like members directing the flow of molten glass between the inlet and outlet ends of the furnace along an extended tortuous flow path.

8. A glass melting furnace as defined in claim 7 wherein said cylindrical-like members include a plurality of cylinders closed at one axial end by said closing means and open at an opposite axial end by means of said open portions, and said closing off means including a plate extending transversely of said shortest path.

9. A glass melting furnace as defined in claim 7 wherein said cylindrical-like members include a plurality of segmented cylindrical members closed at opposite axial ends by said closing means and open along circumferential end portions by means of said open portions, and alternate ones of said radially spaced-apart segmented cylindrical members having their open end portions circumferentially offset.

10. A glass melting furnace as defined in claim 3, wherein said baffle members include a plurality of substantially concentrically arranged spiral baffle members having spiral flow passageways formed therebetween, each of said flow passageways communicating with an individual peripheral opening and a common central opening, and said individual peripheral openings being symmetrically arranged circumferentially about said baffle members.

11. A glass melting furnace as defined in claim 10 including means closing off axial end portions of said spiral flow passageways, and said peripheral and central openings extending through said closing means.

12. A glass melting furnace having an upper inlet portion and a lower outlet portion,
means for melting batch material supplied to the upper inlet portion of said furnace and for forming molten glass in the upper portion of the furnace,
means for discharging molten glass from the lower outlet portion of said furance,
baffle means entending across said furance intermediate said upper inlet portion and said discharge means for establishing at least two zones within said furance and for reducing free convection velocities in the molten glass contained within said furnace,
restricted flow communication means between adjacent zones for inhibiting free convection currents between the adjacent zones,
and said baffle means including wall means, said wall means having portions spaced apart a limited distance for providing flow paths for said molten glass between said upper inlet portion and said discharge means of a limited depth sufficient to inhibit free convection velocities within such flow paths, and for increasing the minimum residence time of the molten glass within the furnace.

13. A glass melting furnace as defined in claim 12 wherein said baffle means includes a plurality of spaced-apart baffle members forming flow passageways therebetween, adjacent ones of said spaced-apart baffle members having off-set open portions communicating with the passageways in opposite sides thereof so as to provide a tortuous flow path through said baffle means and extend the minimum residence time of the glass within the furnace.

14. A glass melting furnace as defined in claim 12 wherein said baffle means includes an insulated baffle positioned adjacent said discharge means to inhibit heat loss from said melting means through the lower outlet portion of said furnace and thereby increase melting efficiency.

15. A glass melting furnace as defined in claim 12 wherein said baffle means includes a plurality of concentric radially spaced apart arcuate baffle members providing flow passageways therebetween, opposite end portions of adjacent baffle members being open to the flow passageways on opposite sides thereof to provide an extended tortuous flow path for the molten glass between said inlet portion and discharge means of said furnace.

16. A method of increasing the minimum residence time of molten glass within a glass melting furnace having an inlet end and an outlet end and of reducing and inhibiting free convection velocities within the molten glass which comprises;
dividing the volume of molten glass within the furnace into a plurality of confined flow paths including at least one free convection path having a relatively small volume of molten glass therein compared to the total relatively large volume of glass contained in the furance to thereby reduce convection velocities within such total volume of glass, and at least one forced convection path having a sufficiently small volume of molten glass to inhibit free convection velocities within such glass,
directing said forced convection path across a portion of the furnace transversely of a direct flow path between said inlet and outlet ends to extend the flow paths through said furnace,
and flowing molten glass along a plurality of tortious flow paths between said inlet and outlet ends of the furnace to increase the minimum residence time of such glass within the furnace.

17. A method of melting and refining glass within a vertical melting furnace having inlet and outlet ends which comprises;
supplying batch material to be melted to an upper inlet portion of said furance,
supplying energy to melt said batch material and form molten glass,
providing substantially horizontal baffle surface portions within said molten glass and flowing said molten glass in flow paths along said substantially horizontal baffle portions,
limiting the depth of flow of the molten glass within portions of various flow paths to an extent sufficient to inhibit the formation of free convection currents therein,
and directing the flow paths along a tortious route between the inlet and outlet ends of the furnace to extend the length of the flow paths and increase the minimum residence time of the glass within the furnace.

18. A method of melting and refining glass as defined in claim 17 including the steps of providing baffle surface portions extending longitudinally of said furnace, and flowing said molten glass alternately toward and away from the outlet end of said furnace while generally directing the flow paths transversely of the furnace.

19. A method of melting and refining glass as defined in claim 17 including the step of flowing said molten glass in a plurality of radially directed circumferential flow paths.

20. A method of melting and refining glass as defined in claim 17 including the step of directing the molten glass in a plurality of spiral paths.

* * * * *